United States Patent
Sumner et al.

(10) Patent No.: US 10,122,659 B1
(45) Date of Patent: Nov. 6, 2018

(54) METHODS AND SYSTEMS TO RETRIEVE AND VALIDATE EMERGENCY INFORMATION ASSOCIATED WITH VOIP COMMUNICATIONS

(71) Applicant: Level 3 Communications, LLC, Broomfield, CO (US)

(72) Inventors: Tera J. Sumner, Centennial, CO (US); Christopher R. Sayer, Arvada, CO (US)

(73) Assignee: Level 3 Communications, LLC, Broomfield, CO (US)

(*) Notice: Subject to any disclaimer, the term of this patent is extended or adjusted under 35 U.S.C. 154(b) by 79 days.

(21) Appl. No.: 15/183,378

(22) Filed: Jun. 15, 2016

Related U.S. Application Data

(60) Provisional application No. 62/175,949, filed on Jun. 15, 2015, provisional application No. 62/188,379, filed on Jul. 2, 2015.

(51) Int. Cl.
| | |
|---|---|
| *H04L 12/58* | (2006.01) |
| *H04M 1/725* | (2006.01) |
| *H04M 7/00* | (2006.01) |
| *H04W 64/00* | (2009.01) |
| *H04W 4/90* | (2018.01) |

(52) U.S. Cl.
CPC ............ *H04L 51/046* (2013.01); *H04L 51/20* (2013.01); *H04L 51/36* (2013.01); *H04M 1/72552* (2013.01); *H04M 1/72572* (2013.01); *H04M 7/0075* (2013.01); *H04W 4/90* (2018.02); *H04W 64/006* (2013.01)

(58) Field of Classification Search
CPC combination set(s) only.
See application file for complete search history.

(56) References Cited

U.S. PATENT DOCUMENTS

| | | | |
|---|---|---|---|
| 2006/0109960 A1 | 5/2006 | D'Evelyn | |
| 2008/0200143 A1 | 8/2008 | Qiu | |
| 2008/0312962 A1* | 12/2008 | Kirkwood | G06F 19/323 705/2 |
| 2009/0163171 A1 | 6/2009 | Sporel | |
| 2010/0003948 A1* | 1/2010 | Ray | G10L 13/043 455/404.1 |
| 2010/0215153 A1 | 8/2010 | Ray | |
| 2014/0286197 A1* | 9/2014 | Zhu | H04L 29/06027 370/259 |

(Continued)

*Primary Examiner* — Brian D Nguyen

(57) ABSTRACT

A VoIP 911 application is accessible to VoIP callers in the form of a portal and/or at least one API executed by one or more of a plurality of computing systems to retrieve a physical location of a VoIP user utilizing a VoIP number. A known postal address is generated from the physical location. The postal address is processed using a GIS system to determine if the postal address is a valid actual address. The postal address is processed using geocoding, and an updated MSAG address associated with the location of the VoIP user is generated. The VoIP 911 application may comprise an instant messaging application. The IM application is installed to and/or integrated with existing software packages. A VoIP user may update emergency information by submitting a current physical location of the VoIP user via an IM chat window. The physical location submitted is validated and confirmed.

16 Claims, 11 Drawing Sheets

(56) References Cited

U.S. PATENT DOCUMENTS

2014/0376414 A1* 12/2014 Edge ................. H04L 29/06027
370/259
2016/0192163 A1* 6/2016 Miner ..................... H04W 4/22
455/404.1
2016/0309026 A1* 10/2016 Sterman ............... H04M 3/5116

* cited by examiner

US 10,122,659 B1

METHODS AND SYSTEMS TO RETRIEVE AND VALIDATE EMERGENCY INFORMATION ASSOCIATED WITH VOIP COMMUNICATIONS

CROSS REFERENCE TO RELATED APPLICATIONS

This application claims priority under 35 U.S.C. § 119 from U.S. Provisional Application No. 62/175,949 entitled "EMERGENCY RESPONSE NETWORK SYSTEM," filed on Jun. 15, 2015, and U.S. Provisional Application No. 62/188,379 entitled "EMERGENCY LOCATION SERVICE," filed on Jul. 2, 2015, all of which are fully incorporated by reference herein for all purposes.

TECHNICAL FIELD

Aspects of the present disclosure generally relate to communication networks; and more particularly, to an emergency location service for voice over Internet protocol (VoIP) using an instant messaging service.

BACKGROUND

For over half a century, the 9-1-1 (911) call system has been widely utilized by North America for emergency response situations. The three-digit telephone number 911 has been designated as the "Universal Emergency Number" for citizens throughout the United States to request emergency assistance. It is intended as a nationwide telephone number and gives the public fast and easy access to a Public Safety Answering Point (PSAP). Approximately 96% of the geographic US is covered by some type of 911 call system.

Conventional wired communication systems, such as wired landline telephones, utilize a specific emergency response implementation referred to as enhanced 911 (E911). Using E911, when a caller dials 911, the caller's telephone number and location are automatically sent to a 911 operator. Location is an important concept in the way that the E911 works. Location determination depends upon entries located within an Automatic Location Information (ALI) database. The ALI database information provides the automatic display at the PSAP of the caller's call back number, the address or location of the caller and, in some cases, supplementary emergency services information.

Conventional mobile phone communication systems utilize mobile positioning centers (MPCs) to locate callers who dial 911 from mobile phones. The MPC serves as the entity that retrieves, forwards, stores and controls position data within the location network. It can select the Position Determining Entity (PDE) to use in position determination and forwards the position to the requesting entity or stores it for subsequent retrieval. In other words, the mobile position center is the database, process, or service within a communication system that determines the physical position of a mobile device.

Increasingly, phone systems are using voice over Internet protocol (VoIP). VoIP is a technology that allows a caller to make voice calls using a broadband Internet connection instead of a conventional (or analog) phone line. VoIP services convert voice audio into digital signals that travel over a network, including the Internet. When calling a regular phone number from a VoIP number, the signal is converted to a conventional telephone signal before it reaches the destination. VoIP calls can be made directly from a computer, a special VoIP phone, or a traditional phone connected to a special adapter. In addition, wireless "hot spots" in locations such as airports, parks, and cafes with connection to the Internet may enable use of VoIP service wirelessly.

With its portability, cost savings, and the promise of enhanced functionality, Internet-based telephony is becoming the de facto choice in various jurisdictions. VoIP has a range of advantages including being a flexible communication system. For example, an end user, assigned a specific VoIP number for a VoIP phone at a first physical location, can receive calls sent to that VoIP number in the first physical location via the VoIP phone, and also have the VoIP number configured to port calls received from the VoIP number to another VoIP phone or mobile device of the end user when the end user is remote from the first physical location, e.g., at a second physical location. As such, the VoIP number can travel with the end user such that the end user can be accessible via a single VoIP number at different locations.

However, in contrast to the emergency location look-up protocols of conventional wired communication systems, the virtual nature of VoIP can raise issues in the context of emergency response situations. For emergency response, conventional VoIP systems use a VoIP positioning center (VPC) to identify the location of a caller requesting emergency assistance using a VoIP phone line. VPC systems, however, may use an outdated database and do not take into account situations where an end user has dialed 911 using a VoIP line but the end user is not located at the physical location normally associated with the VoIP number as defined in the VPC.

It is with these observations in mind, among others, that various aspects of the present disclosure were conceived and developed.

SUMMARY

A need exists for improved methods and systems to retrieve, update, and validate emergency information about VoIP callers. Accordingly, aspects of the present disclosure comprise a method of validating emergency information for a voice over internet protocol (VoIP) number using an instant messaging (IM) application, comprising: utilizing a computing device comprising at least one processing unit in communication with at least one tangible storage media, the tangible storage media further including computer executable instructions for performing operations of: displaying a prompt message to a chat window of the IM application to request acknowledgement about predefined terms of service for updating the emergency information associated with the VoIP number; receiving a confirmation accepting the predefined terms of service at the chat window; receiving a request to update the emergency information at the chat window; receiving physical location information in a form of a plurality of text messages inputted through the chat window; validating the physical location information; displaying at least one address via the chat window based on the physical location information; and receiving a selected address by a selection inputted to the chat window.

Aspects of the present disclosure may further comprise an emergency location system for validating emergency information of a voice over internet protocol (VoIP) number using an IM application, comprising: a network service computing device comprising at least one memory for storing instructions that are executed by at least one processor to: receive a request to update physical location information for the VoIP number via a chat window; interpret a plurality of input commands received via the chat window to retrieve the physical location information; validate the physical location information receive a selected address based upon the validated physical location information; and update the emergency information for the VoIP number using the selected address.

Aspects of the present disclosure may further comprise a method of validating emergency information for a voice over internet protocol (VoIP) number using an IM application, comprising: utilizing a network service computing device comprising at least one memory for storing instructions that are executed by at least one processor for performing operations of: identifying a change in location associated with the VoIP number; receiving physical location information associated with the VoIP number via a chat window of the IM application; and updating the emergency information for the VoIP number using the physical location information.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
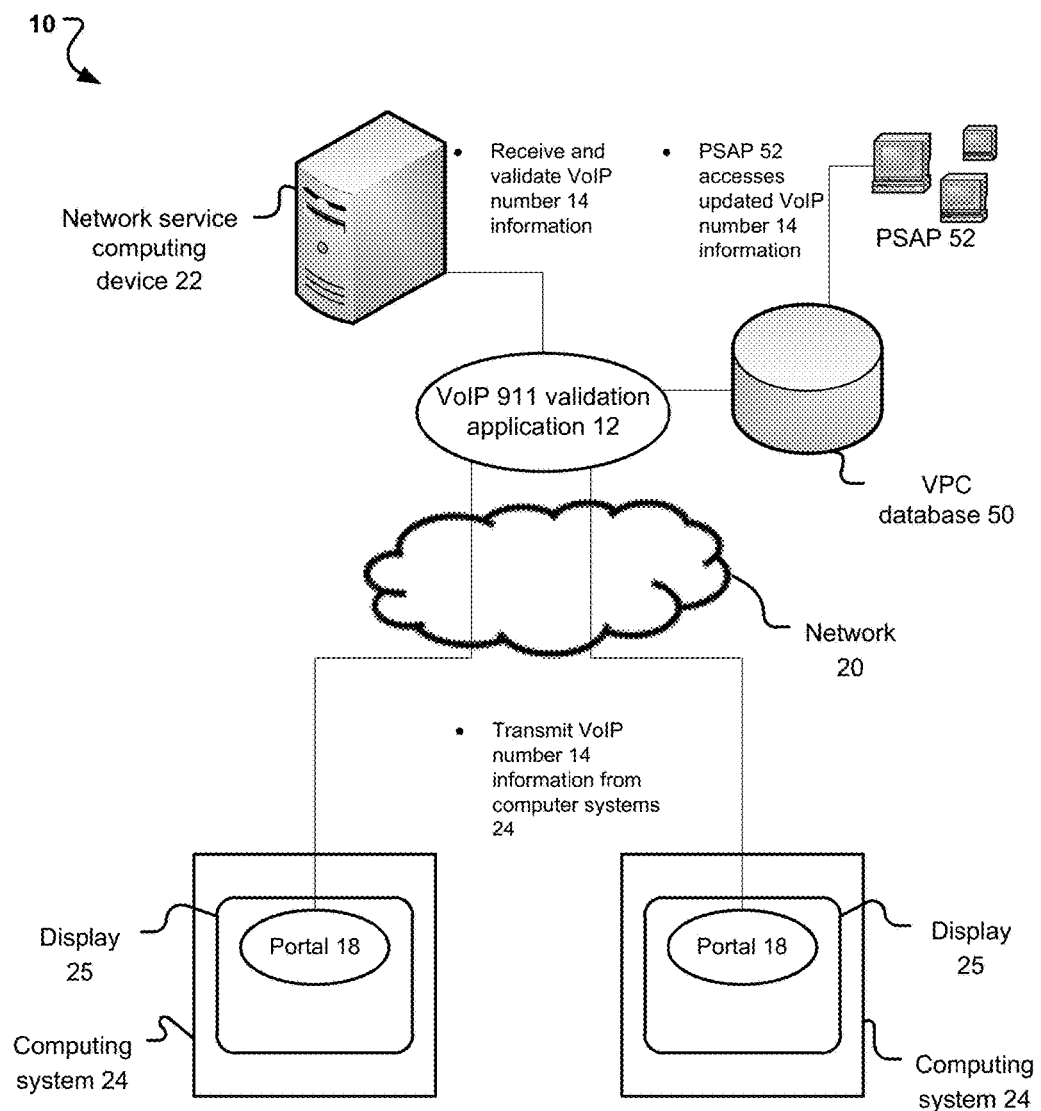
FIG. 1 is an exemplary system for an emergency location and response network utilizing a validation portal, according to aspects of the present disclosure.

Aspects of the present disclosure comprise methods and systems to retrieve and validate emergency location information of a VoIP caller in an Internet Protocol (IP) network using a VoIP 911 application. The VoIP 911 application may take the form of a validation application hosted on a network service computing device. The validation application may be accessible to VoIP callers in the form of a portal and/or at least one application programming interface (API) executable by one or more of a plurality of computing systems. The validation application may be operable to validate the specific location of a VoIP user operating a VoIP number to ensure that emergency responders can accurately locate the VoIP user in the case of an emergency call. Specifically, a VoIP number and an associated physical location of a VoIP user utilizing the VoIP number may be retrieved. A known postal address may be generated from the physical location information retrieved from the VoIP user and the postal address may be verified using a geographic information system (GIS) system to determine if the postal address is a valid actual address. The postal address may be processed using geocoding, and an updated master street address guide (MSAG) address associated with the location of the VoIP user may be generated for confirmation. The updated MSAG address defines emergency location information for the VoIP user that may aid dispatchers in the event of an emergency involving the VoIP user.

In another implementation, the VoIP 911 application may take the form of an instant messaging (IM) application for retrieving emergency location information associated with VoIP users so that the information is available to emergency dispatchers. The IM application may be installed to and/or integrated with existing software packages such as an existing IM service or unified communications (UC) platform already available to VoIP users in order to make certain functionality of the IM application accessible to VoIP users. In one example, the IM application may enhance an existing IM service by enabling a VoIP user to update an emergency location associated with a VoIP number directly through an IM session of the IM service. Specifically, the VoIP user may access an IM chat window to update emergency information by submitting a current physical location of the VoIP user in an IM chat window. The physical location submitted may be validated and refined using aspects of the above mentioned validation application. The chat window may comprise a graphical user interface (GUI) comprising a plurality of different input features such as a text input panel to, for example, retrieve text responses or commands from the VoIP user. In one example, the VoIP user may utilize the GUI of the chat window to communicate with the network service computing device and transmit emergency information via the chat window. Using chat windows as disclosed, emergency location information for VoIP users may be efficiently updated.

The IM application may address various limitations of existing IM services and UC platforms that may be unable to verify the location where VoIP calls are being made when the calls originate outside of known telecommunications networks. In some embodiments, where the VoIP user executes the IM application outside of known telecommunications networks, the user may be presented with a chat or pop-up window that automatically prompts the user to submit updated location information.

Identifying the location of a caller is a key concept for emergency response networks. Location determination may in part depend upon an Automatic Location Information (ALI) database which is maintained on behalf of local governments by contracted private third parties. Often, the contracted 3rd party further subcontracts the actual ALI database management to companies such as Intrado, Bandwidth, and TeleCommunication Systems (TCS). The ALI database information provides the automatic display at the PSAP of the caller's call back number, the address or location of the caller and, in some cases, supplementary emergency services information. The ALI database feeds a master street address guide (MSAG) database to keep MSAG addresses updated for emergency responders. MSAG is a database of street names and house number ranges within an associated community used to define emergency service zones (ESZs) and associated emergency service numbers (ESNs), to enable proper routing of 911 calls and display of appropriate emergency response agencies to the PSAP call taker. An updated MSAG address is vital for emergency responders and those requesting emergency services. An MSAG address defines a specific physical location for emergency responders. For example, a standard postal address may define a particular building or set of buildings. In contrast, an MSAG address defines a more specific location, e.g., a particular building or office in a campus.

As discussed above, the portable network nature of VoIP devices and methods makes identification and verification of a VoIP user's specific location (defined by e.g. an MSAG address) problematic such that an accurate location or updated MSAG for a VoIP caller may not always be available to a PSAP and emergency dispatchers. The present disclosure directly addresses such limitations by providing a plurality of novel solutions in the form of portals, APIs, and/or instant messaging applications for retrieving, validating, and enhancing physical location information provided by VoIP users. Utilizing either of a portal or IM service as disclosed, the physical location of a VoIP user can be verified and validated so that the information is accurate and available for transmission to an appropriate PSAP in the case of an emergency.

FIG. 1 illustrates a system 10 which may be an exemplary emergency response network system according to aspects of the present disclosure. As shown, the system 10 comprises a VoIP 911 validation application 12 hosted on a network service computing device 22 that communicates with a plurality of computing systems 24 via a network 20. The network 20 may include a private or public network, such as the internet, or any communication network such as an Internet Protocol (IP) network that allows computing systems 24 to communicate with and transmit VoIP data to and from the network service computing device 22. As shown, the network service computing device 22 further communicates with a VPC database 50 via the network 20. Computing devices of a PSAP 52 may have access to the VPC database 50 in order to retrieve up-to-date location information about VoIP users, associated VoIP telephone numbers, and VoIP devices. In other words, the PSAP 52 may access updated VoIP number 14 information from the VPC database 50 as the VoIP 911 validation application 12 provisions the VoIP number 14 information to the VPC database 50 after validation and processing, as explained below.

The computing systems 24 may comprise VoIP devices (e.g. VoIP phones), general computing devices having access to such VoIP devices, and computing devices running a VoIP application or otherwise having VoIP functionality. Generally, the computing device (e.g., VoIP device) is operable to deliver voice communications and multimedia sessions and communicate with the network service computing device 22 by way of the network 20. In one specific arrangement, the computing systems 24 may be associated with VoIP telephones operated by or otherwise associated with specific users/callers. The computing systems 24 have access to VoIP numbers 14 and can be used to communicate with/access the VoIP 911 validation application 12 in order to update emergency information associated with the respective VoIP numbers 14.

In some embodiments, the computing systems 24 are directly coupled to one or more VoIP phones. In some embodiments, the computing systems 24 and/or the network service computing device 22 may further comprise VoIP phones or computing devices coupled to VoIP phones, mobile phones, smartphones, laptop computers, tablets, or other mobile devices, servers, mainframes, and/or may comprise communication network nodes (e.g., network routers, switches, or bridges). In some embodiments, utilizing a display component (such as a touch-screen display) of a VoIP phone, a user may access and communicate with the network service computing device 22 or the VoIP 911 validation application 12 directly through the VoIP phone and VoIP network to validate and update emergency information specific to the VoIP phone and/or user.

Each of the computing systems 24 may access the VoIP 911 validation application 12 via a portal 18 to modify emergency information for one or more VoIP numbers 14. The portal 18 of the VoIP 911 validation application 12 provides the functionality for updating and validating emergency location information associated with each of the VoIP numbers 14, as explained in greater detail below. The portal 18 may comprise a web interface to allow computing systems 24 access to the VoIP 911 validation application 12 in order to update and validate emergency information for one or more VoIP numbers 14. More specifically, a user may launch a browser in the computing system 24 and log onto a web page to access the portal 18. The portal 18 may further comprise/utilize at least one application program interface (API) that sits behind a web interface to provide the computing systems 24 with access to the VoIP 911 validation application 12. In some embodiments, the portal 18 is accessible to the user via a mobile application downloaded on a computer system 24. In some instances, the API is deployed in the mobile application.

Figure 2:
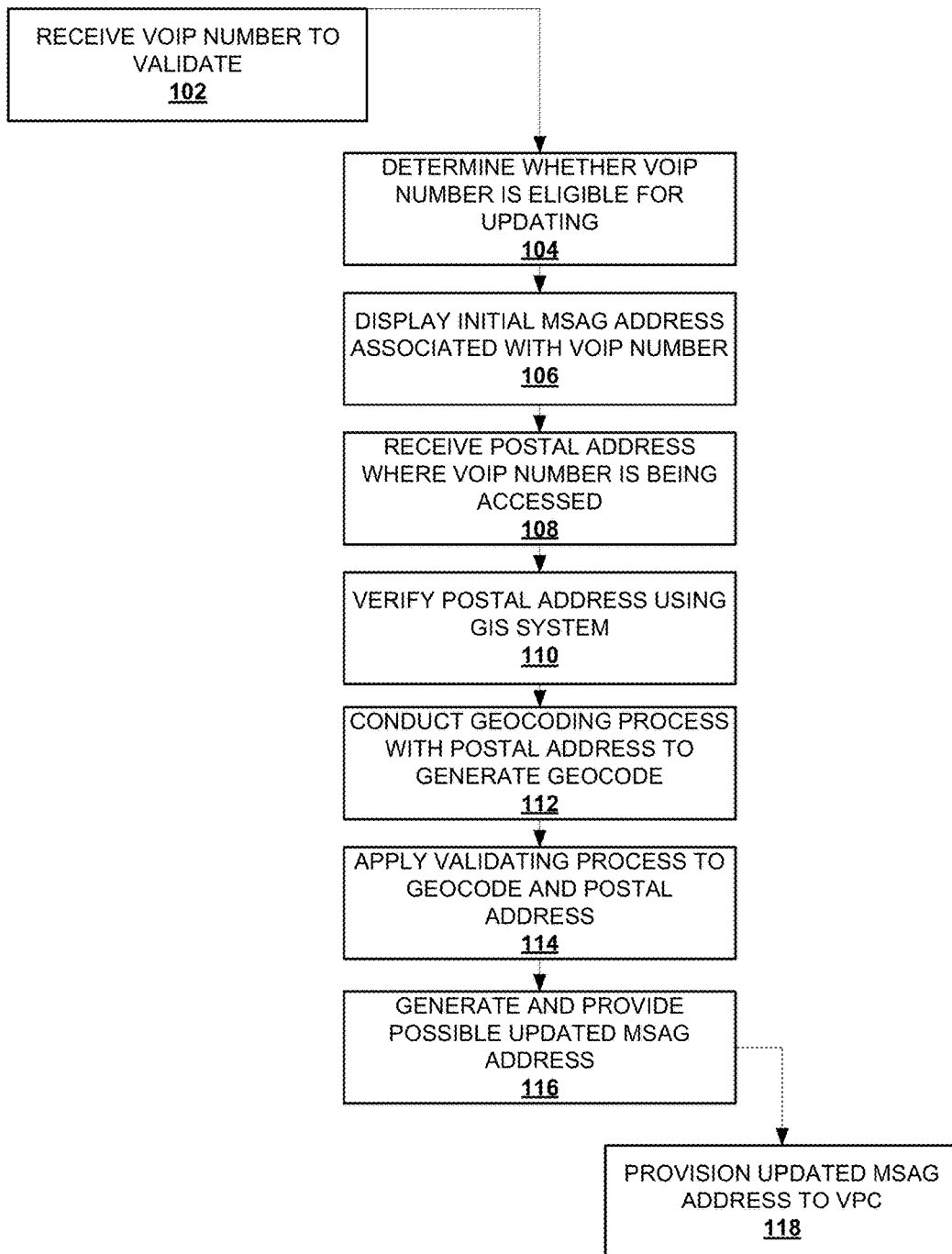
FIG. 2 illustrates a process flow for implementing aspects of the exemplary system of FIG. 1, according to aspects of the present disclosure.

FIG. 2 illustrates an exemplary process flow for implementing and using the system 10 and the VoIP 911 validation application 12, according to aspects of the present disclosure. As shown, in block 102, using one or more computing systems 24 and a portal 18, a user may log into the VoIP 911 validation application 12 and submit a VoIP number 14 and associated information to the VoIP 911 validation application 12 using a portal 18. Accordingly, the VoIP 911 validation application receives the VoIP number to validate. The user may desire to update emergency information for that VoIP number 14, such as updating the physical location of the user while that user is operating/utilizing the VoIP number 14. In some embodiments, the steps of block 102 may be initiated automatically and the user may be prompted to complete the steps of block 102 when the system 10 or VoIP 911 validation application 12 identifies that the user (or computing system 24) is no longer physically located at an address normally associated with the VoIP number 14. In other words, with system 10, the user may in some embodiments be compelled to update their emergency information.

In block 104, the VoIP 911 validation application 12 determines whether the VoIP number 14 is a number that is eligible for updating. More specifically, the VoIP number 14 can be compared to a list of predetermined VoIP telephone numbers stored in a database. The VoIP 911 validation application may be programmed with restrictions that prevent updates to emergency information for VoIP numbers that do not match the predetermined VoIP telephone numbers. This may be useful where emergency information associated with certain VoIP numbers is already being updated by other systems. If the VoIP 911 validation application 12 matches the VoIP number 14 with one of the predetermined VoIP numbers in the database, and consequently determines that the VoIP number 14 is eligible for updating, the VoIP 911 validation application 12 permits the user to select the VoIP number 14 and proceed with updating information associated with the same.

In block 106, the VoIP 911 validation application 12, accessed through the portal 18, displays (via a display device 25 of a computing system 24) the MSAG address currently provisioned for 911 responses with respect to the VoIP number 14. As discussed above, the MSAG address not only includes postal address information but also may include a particular building, room, floor, and suite # and allows emergency responders to quickly locate 911 callers. It should be understood that MSAG addresses may vary according to different locations. For example, a Chicago MSAG address may have a different format than an MSAG address retrieved from a Dallas location. In some cases the MSAG address currently provisioned for 911 responses with respect to the VoIP number 14 may be out of date or incomplete. For example, the current MSAG address may be missing an office number or floor number.

In block 108, to update the MSAG address for the VoIP number 14 and ensure that emergency responders would be dispatched to the correct location when 911 is dialed from the VoIP phone number 14, the user inputs a postal address associated with the present location of the user by interacting with an input device of the computer system 24 such as a keyboard, mouse, or touchpad. In addition to the postal address, the VoIP 911 validation application 12 may also retrieve through the portal 18 a building, room, floor, suite, or other such information to update the MSAG address for the VoIP number 14.

In block 110, the postal address, along with any other location information, may be processed by one or more validation systems. For example, the postal address may be verified by a geographic information system (GIS) accessible to the network service computing device 22. The GIS may be utilized in order to validate the received postal address and ensure that the postal address is an actual recognizable address that can be posted to for whatever reason. Utilizing a GIS increases the likelihood that valid data is being utilized before further processing and analysis. In some embodiments, a map may be displayed to the user via the display device 25 of computing system 24 to clearly identify the location of the postal address. In some embodiments, the GIS comprises various geographic databases accessible via one or more computing devices and may include MapQuest®, USPS®, and United States government systems to validate the postal address submitted by the user. The VoIP 911 validation application 12 may retrieve data and implement resources from different data sources (e.g. MapQuest®, USPS®) to verify the postal address. In other words, the GIS may comprise a centralized hub operable to retrieve data and pool data from the different data resources to confirm a postal address. Where a postal address is recognized by one or more of the data sources, the postal address may be deemed as valid, or known, and may be deemed acceptable for additional processing. The GIS may, in response to an inputted postal address, display a list of known, or valid postal addresses that closely resemble the inputted postal address and allow a user to select a known postal address from the list. Verifying the postal address with the GIS may increase the likelihood that the value of the postal address can be successfully subjected to a geo-coding process. A GIS may aid with typographical errors during input of the postal address. For example, where the user misspells an address or city, the VoIP 911 validation application 12, in cooperation with a GIS, can flag the error and can transmit a message to a computing system 24 via the portal 18 to confirm whether the user in fact meant to input the postal address as originally submitted. The VoIP 911 validation application 12 can further transmit suggestions to a computing system 24 associated with the user that attempt to correct or anticipate typographical errors committed by the user. For example, where the user inputs, "Kansa City, Mo.", the VoIP 911 validation application 12 can transmit a message to the computing system 24 associated with the user that asks, "did you mean Kansas City, Mo.?"

In block 112, using the VoIP 911 validation application 12, the postal address may be subjected to a geocoding process for global positioning. In some embodiments, geocoding is the process of converting addresses (e.g. "1701 Alpha Way, Denver, Colo.") into geographic coordinates (e.g. latitude and longitude) and generating a geo-code, which can then be used to place markers on a map, position the map, provide automated mapping, directions, and other such similar functions. The geo-code generated may comprise a standard format for global positioning.

In block 114, the postal address, in combination with the geo-code derived from the postal address, may be further processed using at least one predefined validation algorithm and at least one of a plurality of open databases, such as the MSAG database, a database of an emergency communications systems and service provider (such as an Intrado database), and/or a V3M database, or the like. Using the open databases, processing with a validation algorithm can be applied to the value of the postal address and the value of the geo-code to determine a valid updated MSAG address. In some embodiments, this processing may essentially bump up the postal address and geo-code values together or combine the values. More specifically, in some embodiments, the validation process may take values associated with the geo-coding information and the postal address, apply such values as input parameters to the validation algorithm, and run the validation algorithm through one or more of the open databases to produce an output. The resulting output may be one or more MSAG addresses as possible options for an updated MSAG address for the VoIP number 14.

The open databases may further be used to validate and/or verify the input parameters of the validation algorithm (postal address and geo-code) and/or the output MSAG addresses to determine whether such values constitute a "dispatchable" location" which may be a location where 911 services are in fact available. A non-dispatchable location may be an area where 911 services are not offered. The VoIP 911 validation application 12 may verify whether one or more of the MSAG address options derived from the validation algorithm are dispatchable by identifying MSAG addresses and locations where 911 services are not available using the open databases. The open databases may store or otherwise have access to information about geographical areas and/or MSAG addresses where 911 services are not available. To determine whether an MSAG address is dispatchable, a look-up of data from one or more of the open databases may be conducted to verify that the MSAG address does not fall within geographical areas where 911 services are not available. As such, the VoIP 911 validation application 12 may determine whether an MSAG address is dispatchable and the results may be presented to the user for final verification.

As described, the open databases assist with MSAG generation and verifying that input parameters and MSAG addresses generated are associated with dispatchable locations available for emergency responders. In some embodiments, the above databases may be described as "open" because the databases utilize open database connectivity (ODBC), and an API for accessing database management (DBM) systems. Using ODBC, an OBDC driver may be implemented as a translation layer between an application, such as the VoIP 911 validation application 12, and a DBM system, e.g. an emergency services open database may take the form of a DBM system. The VoIP 911 validation application 12 may use ODBC functions through an ODBC driver manager to pass queries from the VoIP 911 validation application 12 to the DBM (e.g. an emergency services open database).

In block 116, once the postal address and the geo-code are processed by the validation algorithm and one or more open databases, the VoIP 911 validation application 12 provides the user with a proposed updated MSAG address by presenting the proposed updated MSAG address to the user through the portal 18 so that the user can confirm the proposed MSAG address. In some embodiments, the user may confirm the proposed MSAG address by inputting a command, such as "yes," or "no" or by selecting a button presented through the portal 18. In block 118, if the user confirms the MSAG address, the MSAG address may be provisioned to and stored within the VPC database 50 to update emergency location information associated with the VoIP number 14. Storing the updated MSAG address in the VPC database 50 makes the updated MSAG address available to the PSAP 52. Thus, when the PSAP 52 receives an emergency call from the VoIP number 14, the operator will know the exact, updated address of the user operating the VoIP number 14 and emergency responders can be dispatched to the correct location despite the virtual network nature of the VoIP number 14. So, for example, when a caller dials 911 from the VoIP number 14, the system 10 identifies the location of the user even if the user has moved his/her location while utilizing the VoIP number 14. The updated MSAG address generated by system 10 and VoIP 911 validation application 12 is a validated and updated record that facilitates dispatch of emergency responders. Such a record is especially important in the case where the user is unable to speak and communicate his/her address during an emergency call.

In some embodiments, the VoIP 911 validation application 12 may present a series of errors or alerts via the portal 18 when, e.g., the postal address cannot be identified or updated. For example, the VoIP 911 validation application 12 may cause an alert or error to be displayed through the portal 18 (executed by a computing system 24) to notify a user when a postal address inputted to the portal 18 is not valid or fails to generate a geo-code. Where the VoIP 911 validation application 12 is unable to identify a postal address, or a user accessing the VoIP 911 validation application 12 via a computing system 24 receives an inordinate amount of errors, the VoIP 911 validation application 12 can display to the user via the portal 18 a telephone number and instruct the user to contact a phone representative (e.g. 911 representative team) who can attempt to manually verify a postal address or MSAG address.

In some embodiments, the user, via a computing system 24, may submit a time window value to the network service computing device 22 and VoIP 911 validation application 12 to alert the VoIP 911 validation application 12 that the user is going to be at a particular location for an X amount of time. The user may need to alert the VoIP 911 validation application 12 that the user will be temporarily making calls from a VoIP number 14 at a temporary physical location (for X amount of time), as opposed to an original location. More specifically, a user may log on to the portal 18, and submit a time value and temporary emergency information to the VoIP 911 validation application 12 by inputting one or more predefined commands, and the time value and temporary emergency information may be stored in a database coupled to the network service computing device 22. The VoIP 911 validation application 12 may then provision emergency information data at the VPC 50 at the commencement of the time value to reflect the temporary location. Then, the VoIP 911 validation application 12 may provision emergency information data at the VPC 50 to reflect the original location at the termination of the time value. As such, the VoIP 911 validation application 12 may be utilized to update emergency information associated with the VoIP number to reflect a temporary location, e.g. for X amount of time. In some embodiments, the time value, and temporary emergency location can be stored in the database coupled to the network service computing device 22 for future use.

In some embodiments, the VoIP 911 validation application 12 may be applied to a plurality of postal addresses in lists, batches, or groups corresponding to a plurality of VoIP numbers 14. For example, a request may be transmitted to the VoIP 911 validation application, 12 with a table of VoIP numbers, from an external computing device using an instance of the portal 18. The table may delineate VoIP numbers, current emergency information associated with the VoIP numbers, and requested updated emergency information (e.g. new addresses) for the VoIP numbers. Using the validation mechanisms described above, the updated emergency information may be validated, and a plurality of validated MSAG address may be generated, based upon the updated emergency information, for the respective VoIP numbers. The MSAG addresses may then be transmitted to the VPC database 50 for use by a PSAP 52. Accordingly, using system 10, critical emergency location information for a plurality of VoIP numbers 14 can be updated all at once.

In some embodiments, instead of (or in combination with) providing a web portal 18 for users to access VoIP 911 validation application 12, access to the VoIP 911 validation application 12 may be provided using one or more APIs. Accessing the VoIP 911 validation application 12 through one or more APIs can extend greater flexibility for users to update emergency location information. For example, using APIs, a company A can provide access to the VoIP 911 validation application 12 via an API accessible at a website or application of the company A. The API may be accessible through external devices accessing the portal 18 and used to globally communicate with the portal 18 even if data formats at the external devices are different. Additional such implementations of the VoIP 911 validation application 12 are contemplated.

Figure 3:
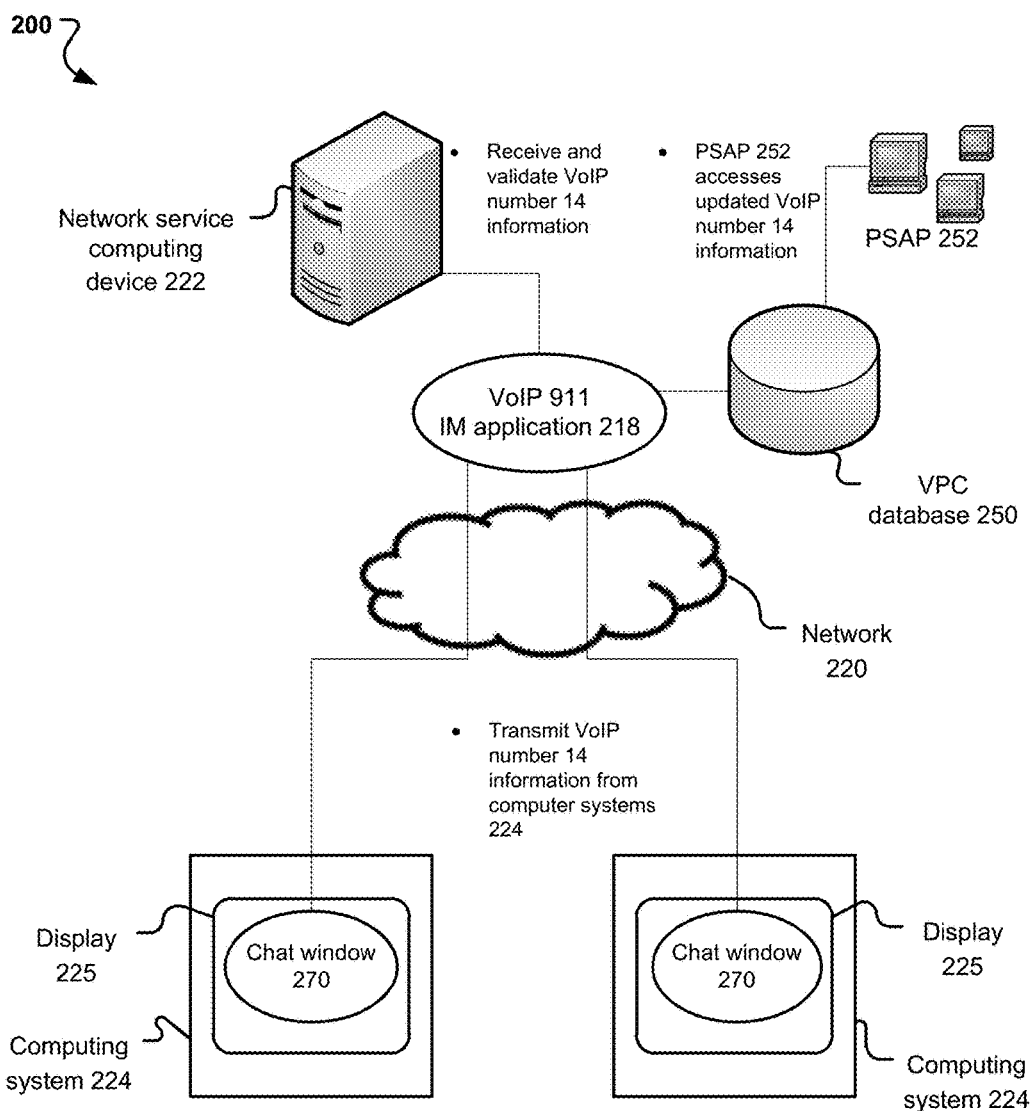
FIG. 3 is another exemplary system for an emergency location and response network utilizing an IM application, according to aspects of the present disclosure.

FIG. 3 is another system 200 which may comprise an exemplary emergency location system or service according to aspects of the present disclosure. As shown, the system 200 may comprise and/or implement a VoIP 911 Instant Messaging (IM) application 218. Aspects of the VoIP 911 IM application 218 may be hosted by a network service computing device 222. Other aspects of the VoIP 911 IM application 218 may be installed or otherwise made accessible by a plurality of computing systems 224 and a network 220. The VoIP 911 IM application 218 may enable online chat functionality in the form of typed electronic messages instantly, in real-time, between, for example, a computing system 224 and the network service computing device 222 to retrieve emergency location information from VoIP users. As such, the VoIP user may access an IM service running on a computing device and through a chat window running in the IM service to communicate with the VoIP 911 IM application 218. The VoIP 911 IM application 218 may be integrated, and/or installed as a tool, update, or add-on to one or more existing unified communications (UC) platforms (e.g. business software suites) or IM services such as Microsoft Lync™ or Skype™ which may already be available or installed to the computing systems 224. A UC platform may be accessible as a software application downloaded to a computing system 224, which may be mobile or desktop oriented, a browser, or the like. A UC may integrate common communications channels and provide video calling, file sharing, PC-to-PC voice calling, and PC-to-regular-phone calling. As such, making the VoIP 911 IM application 218 available via such platforms and extending additional features of the VoIP 911 IM application 218 to such existing resources may provide flexible convenient access for updating and validating emergency location information for VoIP callers.

The basic operation of an IM service may be particularly easy to manage by a user. A VoIP user, via a computing system 224, may initiate/open a chat window of an IM service (which may be configured with the VoIP 911 IM application 218), type a brief message, and toggle a "send" or "enter" key of the computing system 224 to send a message or instruction to a desired recipient. IM services provide particular value because under most conditions, instant messaging communication between two parties using an instant messaging application is almost truly "instant." Even during peak network usage periods, the delay is rarely more than seconds. Two or more users can communicate using an IM session. Alternatively, a user, via a user device, can communicate with a computing device/software application (IM application) where the computing device/software application has been programmed with a predefined set of communication functions. The predefined set of functions may allow the computing device/software application to e.g. initiate an IM conversation with the user, authenticate the user, prompt the user to submit answers to a plurality of queries, and retrieve specific information from the user. Based upon information and inputs from the user, the predefined functions may also include executing tasks based upon the information and inputs received from the user. For example, the computing device communicating with the user device may transmit information to a database after receiving the information or an input via an IM session.

The VoIP 911 IM application 218 of FIG. 3 may be programmed with a set of predefined functions that enable the network service computing device 222 to obtain certain information from a VoIP user via an IM session. For example, the VoIP 911 IM application 218 may be operable to retrieve via an IM chat window, acknowledgment from a VoIP user communicating via the IM chat window executed by a computing system 224, that the user agrees to terms of service with respect to maintaining accurate emergency location. The VoIP 911 IM application 218 may further include a function that allows the application to prompt the user for specific information about the physical location of the user. In other words, using the VoIP 911 IM application 218, a VoIP user may initiate an IM session so that the user can proactively transmit, via an IM chat window, physical location information associated with a particular VoIP phone/number, as elaborated upon in greater detail below.

In the specific case of FIG. 3, the VoIP 911 IM application 218 may be executed and shared between a network service computing device 222 and a plurality of computing systems 224 via a network 220. The network 220 may be similar to network 20 of FIG. 1 and may comprise an Internet Protocol (IP) network, the internet, or any communication network that allows computing systems 224 to communicate with and transmit data to and from the network service computing device 222 via e.g. a shared IM session. The computing systems 224, similar to computing systems 24 of FIG. 1, may comprise VoIP phones or computing devices coupled to VoIP phones, mobile phones, smartphones, laptop computers, tablets, or other mobile devices, servers, mainframes, and/or may comprise communication network nodes (e.g., network routers, switches, or bridges). The computing systems 224 are operable to initiate IM sessions with the network service computing device 222, using the VoIP 911 IM application 218, to validate and update emergency information specific to VoIP numbers 14 and/or VoIP communication devices, such as VoIP phones. In some embodiments, the computing systems 224 are directly coupled to one or more VoIP phones.

As further shown in FIG. 3, the network service computing device 222 communicates with a VPC database 250 via the network 220, and may comprise at least one of a server, mainframe, desktop computer, or network element similar to the network service computing device 22 of FIG. 1. The VPC database 250, like the VPC database 50, may be an external third party database operated by, e.g., Intrado, Bandwidth, or TCS. Physical location information, which may include a postal address in addition to other physical location information such as a building or office number, received by the VoIP 911 IM application 218, may be transmitted to the network service computing device 222 and further transmitted to the VPC database 250 for MSAG creation, validation, and storage within the database.

The VoIP 911 IM application 218 may prompt a user, who accesses a VoIP device and associated VoIP number 14 at a particular location, to provide updated emergency location information, via an IM session or chat window. More particularly, via a chat window, the user may be prompted to select choices from drop down menus, bullets, checkboxes, and submit text to provide physical information about where the user is accessing the VoIP phone and associated number. The user may be prompted to submit a postal address and associated physical location information. Similar to the steps described above in FIG. 2, the physical information associated with a VoIP number can then be refined and validated and an MSAG address can be generated from the physical information. MSAG creation and validation using the physical location information can be conducted in a number of ways and may differ according to the systems and methods employed by each particular third party database. In some embodiments, the user may submit a VoIP number or a VoIP number may be inherently tied to a user of the VoIP 911 IM application 218. The user may input a command to update physical emergency information, such as a postal address, associated with the VoIP number. The physical location information may be submitted to, e.g., an emergency communications systems and service provider such as Intrado, and can be processed by a geographic information system (GIS). The GIS can verify that a postal address is an actual recognizable address. In some embodiments, a map may be displayed to the user via a chat window of the VoIP 911 IM application 218, to show the location of a postal address/physical location submitted by a user. In some embodiments, the GIS comprises various geographic databases and may include MapQuest®, USPS®, and United States government systems to MSAG verify a postal address submitted by the user via a chat window as a known address.

The postal address may further undergo a geocoding process for global positioning. As described above, geocoding may comprise converting addresses (e.g. "1701 Alpha Way, Denver, Colo.") into geographic coordinates (e.g. latitude and longitude) and generate a geo-code, which can then be used to place markers on a map, position the map, provide automated mapping, directions, and other similar functions. Further, the postal address, in combination with the geo-code derived from the postal address, can be processed using at least one validation algorithm to determine a valid updated MSAG address. Further still, similar to the system 10 of FIG. 1, once an MSAG address is validated by, e.g., Intrado, the MSAG address can be provisioned to the PSAP 252 in the case of an emergency. The PSAP 252 may access updated VoIP number 14 information from the VPC database 250 as such information is being validated and processed.

Figure 4:
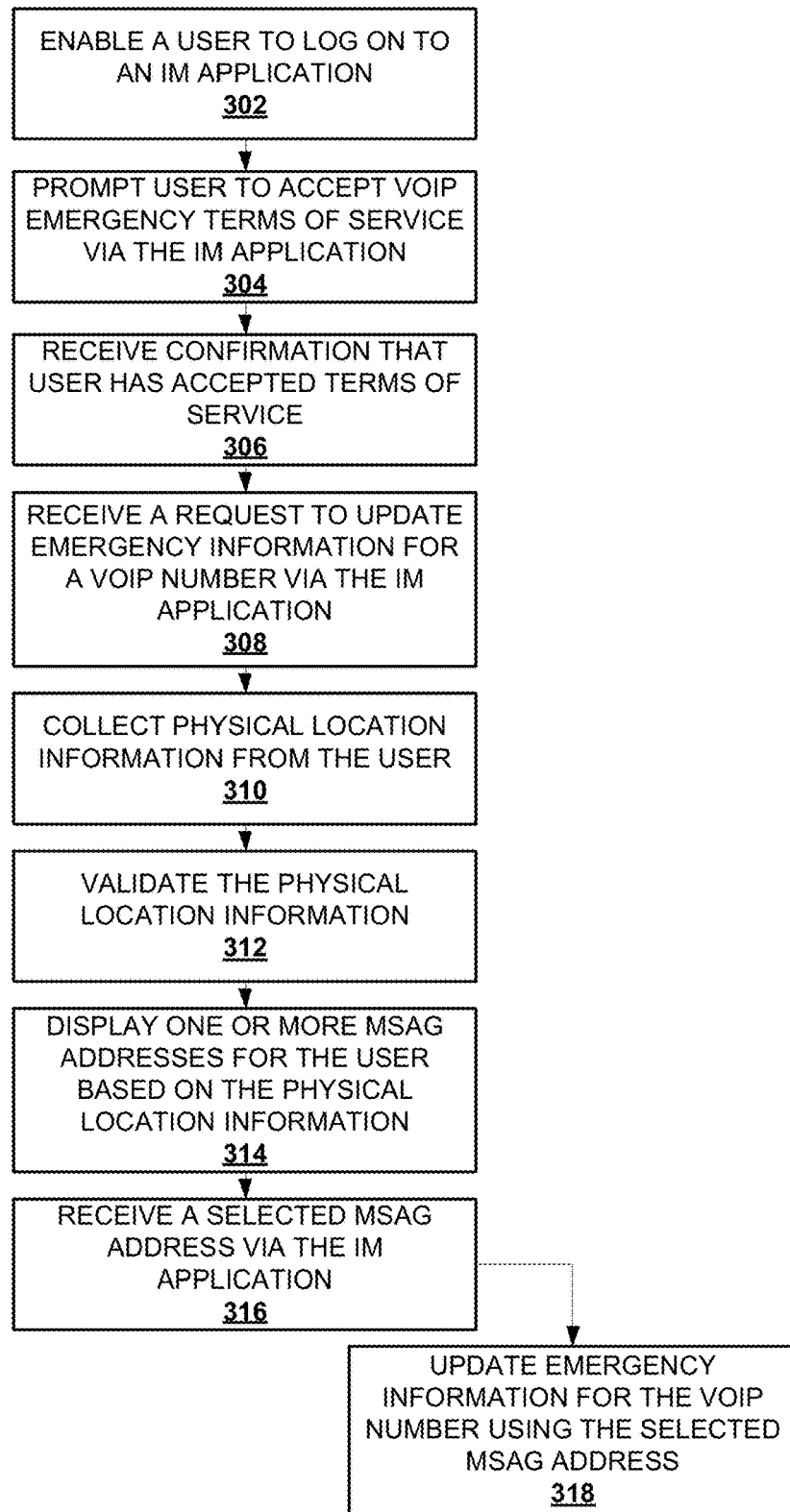
FIG. 4 illustrates a process flow for implementing aspects of the exemplary system of FIG. 3, according to aspects of the present disclosure.

FIG. 4, with reference to FIGS. 5A-5F, illustrates an exemplary process flow for system 200 and implementing a VoIP 911 IM application 218 to retrieve, update, and/or validate emergency location information for VoIP callers. As previously described, the VoIP 911 IM application 218 may be integrated with or otherwise made accessible via other software packages such as an email client, IM service, UC platform, or the like. In one specific embodiment, the VoIP 911 IM application 218 may comprise an add-on application that can be bundled into an existing IM service such as Microsoft Lync.

In block 302, a VoIP user may log on to or otherwise access the VoIP 911 IM application 218 (via e.g. a UC platform, such as Microsoft Lync, or Skype for Business, to which aspects of the VoIP 911 IM application 218 have been installed or otherwise made accessible). The VoIP user may log onto the VoIP 911 IM application 218 using a computing system 224. In some embodiments, logging onto the VoIP 911 IM application 218 may launch a chat window 270 which may appear to a VoIP user on a display 225 of the computing system 224. Alternatively, the VoIP user may proactively launch a chat window 270 of the VoIP 911 IM application 218 by e.g., interacting with an existing IM service to which the VoIP 911 IM application 218 has been installed. An exemplary chat window 270 is shown e.g. in FIG. 5A. The chat window 270 may comprise a GUI 272 comprising a reading pane 274, and a text input panel 276 below the reading pane 274. The GUI 272 may comprise additional features such as buttons to initiate a call to a 911 admin or operator, initiate a video, or add additional contacts to the IM session made accessible by the chat window 270. Orientation of the chat window's features, reading pane 274, and text input panel 276 is not limited to the embodiment shown. The chat window 270 and GUI 272 may vary in appearance depending on the service providing access to the VoIP 911 IM application 218. In some embodiments, the chat window 270 can be displayed when the VoIP user logs into the VoIP 911 IM application 218 from a different or unrecognized IP address. Alternatively, the user may initiate the display and chat window 270 voluntarily.

As described above, the VoIP 911 IM application 218 may be programmed with logic and a predefined set of functions that enable the network service computing device 222 to retrieve information from a computing system 224 and an associated VoIP user via an IM session. The predefined set of functions may allow the network service computing device 222 and VoIP 911 IM application 218 to e.g. initiate an IM conversation with the VoIP user associated with a computing system 224, authenticate the user, prompt the user to submit answers to a plurality of queries, and retrieve specific information from the user. Based upon information and inputs from the user, the VoIP 911 IM application 218 may execute instructions, invoke certain methods, and the like based upon the information and inputs received from the user. As such, based upon information received via a computing system 224 and an associated VoIP user via an IM chat window, the network service computing device 222 may retrieve emergency location information about the VoIP user and a VoIP number 14. As a specific example, as shown in the chat window 270 of e.g. FIGS. 5A-5B, a header of the reading pane 274 may read, "Emergency Location Service—Text "Update" to start." In other words, by entering "Update" (input command) in the text input panel 276 of the chat window 270, the VoIP user may cause the VoIP 911 IM application 218 to execute a predefined method/function and initiate an emergency location service IM update session to update the VoIP user's emergency information.

As shown in block 304, a VoIP user accessing the VoIP 911 IM application 218 via a computing system 224 may be prompted to accept certain predetermined terms of service regarding maintaining emergency location information via a chat window 270. In some embodiments, the user may be prompted by the VoIP 911 IM application 218 to confirm/accept the certain terms of service before the user is allowed to, e.g., access other software packages. The terms of service may be predefined terms that caution or alert VoIP users about the risks and dangers of operating VoIP phones without updating emergency services regarding up to date information about where such VoIP phones and/or phone lines are being operated. The terms of service may include policies or rules for users to update emergency information. The VoIP 911 IM application 218 may be operable to retrieve via the IM chat window 270, acknowledgment from a VoIP user communicating via the IM chat window 270 and executed by a computing system 224, that the user agrees to terms of service with respect to maintaining accurate emergency location.

Figure 5A:
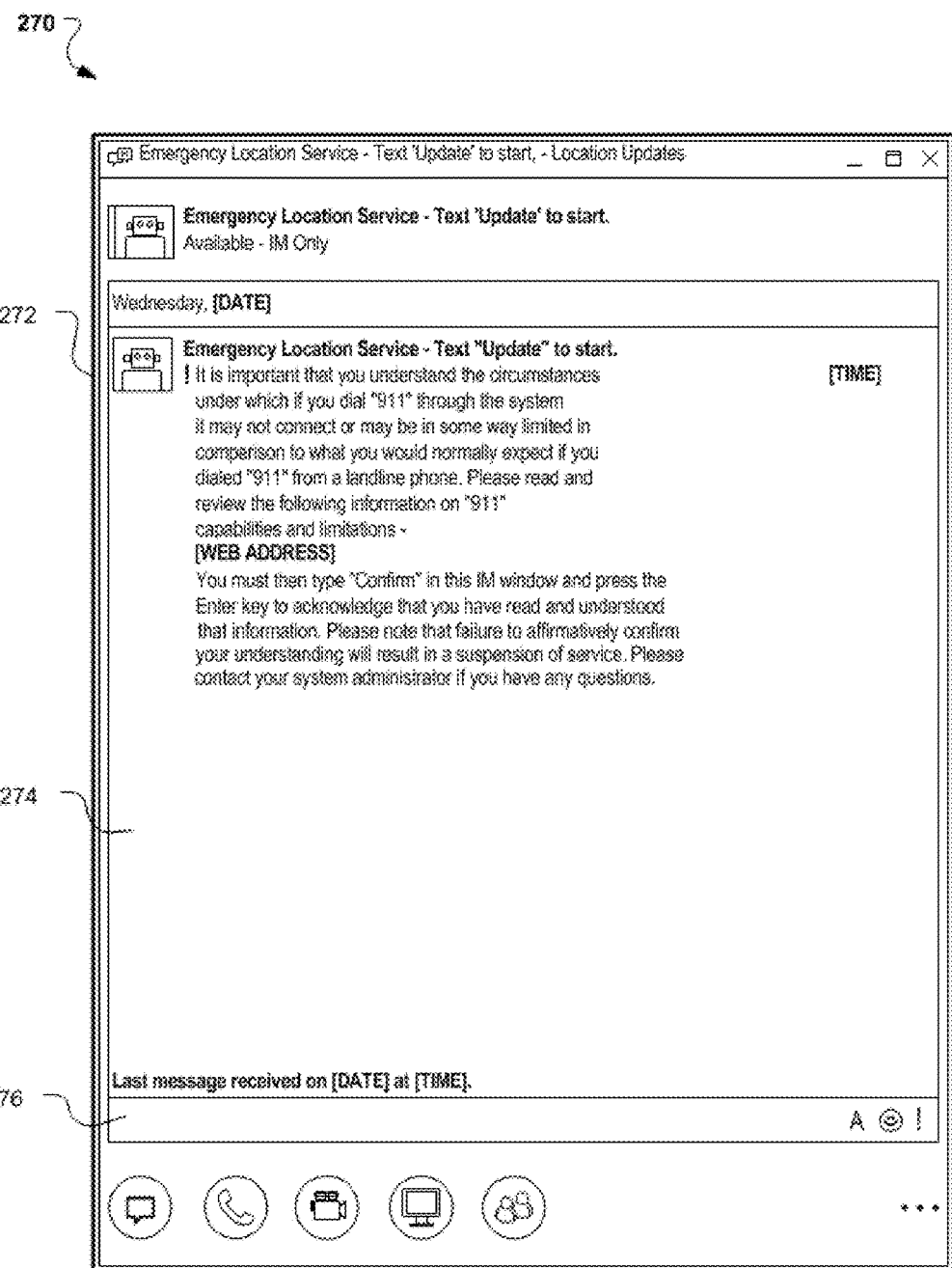
FIGS. 5A-5F show exemplary screenshots associated with the IM application of FIGS. 3 and 4 illustrating aspects of the present disclosure.
Figure 5B:
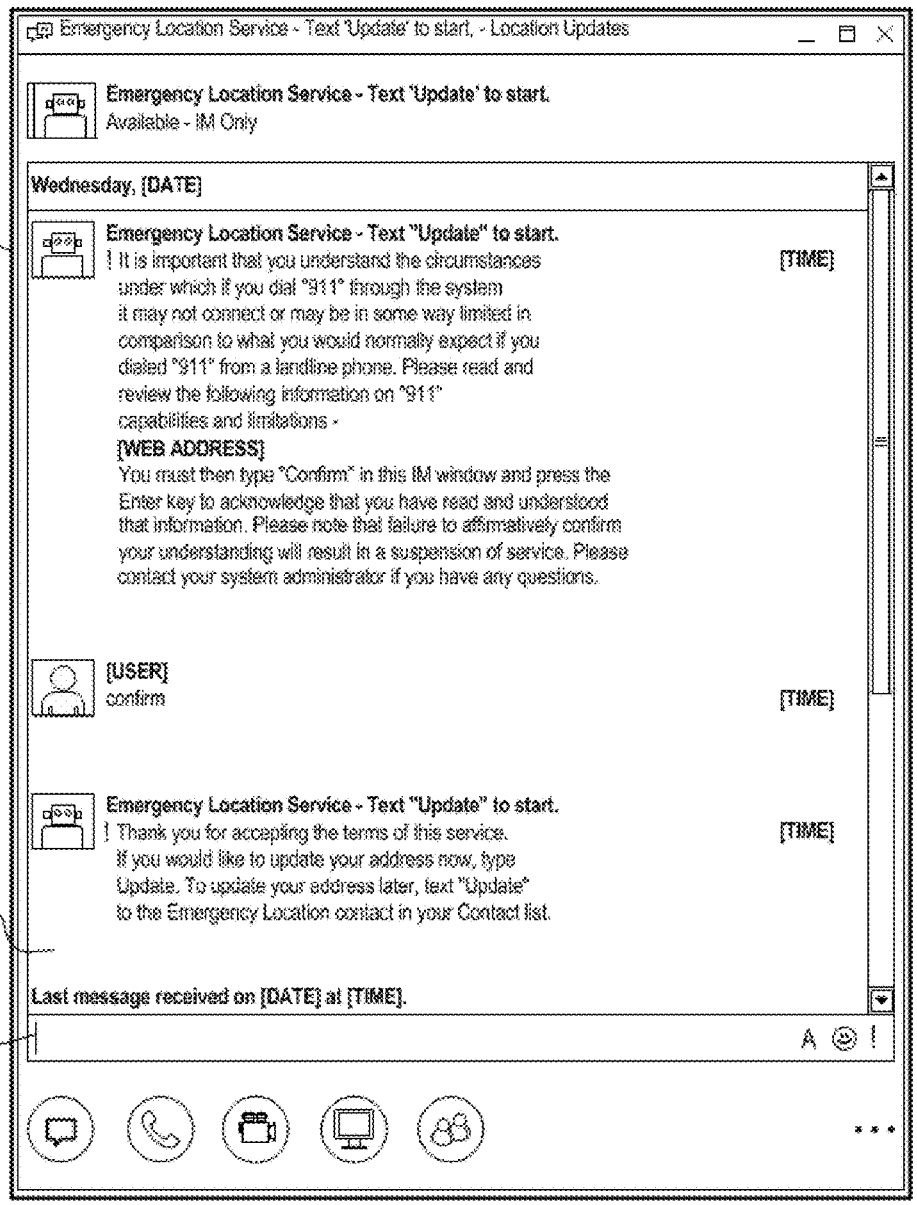

Block 304 may be illustrated by the example shown in FIG. 5A. In FIG. 5A, a message may be sent to the VoIP user upon initiation of an IM session. The sender of the message may be listed in the chat window 270 as, an "Emergency Location Service." The Emergency Location Service may represent a computer participant of the IM session and be associated with e.g. the network service computing device 222 and/or the VoIP 911 IM application 218. The VoIP 911 IM application 218 may be programmed to send the VoIP user messages and retrieve information from the VoIP user. As shown, the message may request that the VoIP user confirm understanding as to certain terms of service. The message may provide a hyperlink to detailed information, such as a full disclaimer about the terms of service. The message may indicate that the VoIP user's failure to confirm understanding as to the certain terms of service may result in suspension of certain services normally available to the VoIP user. In the example of FIG. 5A, a user is prompted with such a message via the shown chat window 270, with a hyperlink to a disclaimer and a request for acknowledgement by the user. As previously described, a VoIP user may be required to confirm understanding as to the terms of service before utilizing different software utilities. Requiring a user to accept, or at least view terms of service about maintaining emergency location information before accessing different software utilities may increase the number of VoIP users that update emergency location information. In some embodiments, the VoIP 911 IM application 218 is operable to recognize that a VoIP user is logging into the VoIP 911 IM application 218 for the first time, or that the VoIP user is accessing the VoIP 911 IM application 218 via a network that the VoIP 911 IM application 218 does not recognize, which may result in automatic pop-up of a chat window like the chat window 270 shown. Further, the VoIP 911 IM application 218 may be configured to stop prompting for VoIP user information when the VoIP user accesses the VoIP 911 IM application 218 from a known network (a network that the VoIP user has previously submitted location information for).

In block 306 of FIG. 4, the user may confirm understanding or accept the terms of service by submitting a text response via the text input panel 276 of the chat window 270. In the example shown in FIG. 5B, the user may type, "confirm" (input command) which the VoIP 911 IM application 218 may recognize as a predefined function that, e.g., allows the user to access other features of the IM service or UC platform with which the VoIP 911 IM application 218 is integrated. The VoIP 911 IM application 218 may transmit an entry to a database coupled to the network service computing device 222 that indicates the user has confirmed understanding as to the terms of service on a particular day, and/or at a particular location. As further shown in some embodiments, the chat window 270 can return a confirmation message to the user thanking the user for confirmation and notifying the user that he/she can update physical location information for emergencies by submitting the message "update" in the text input panel 276 of the chat window 270.

Figure 5C:
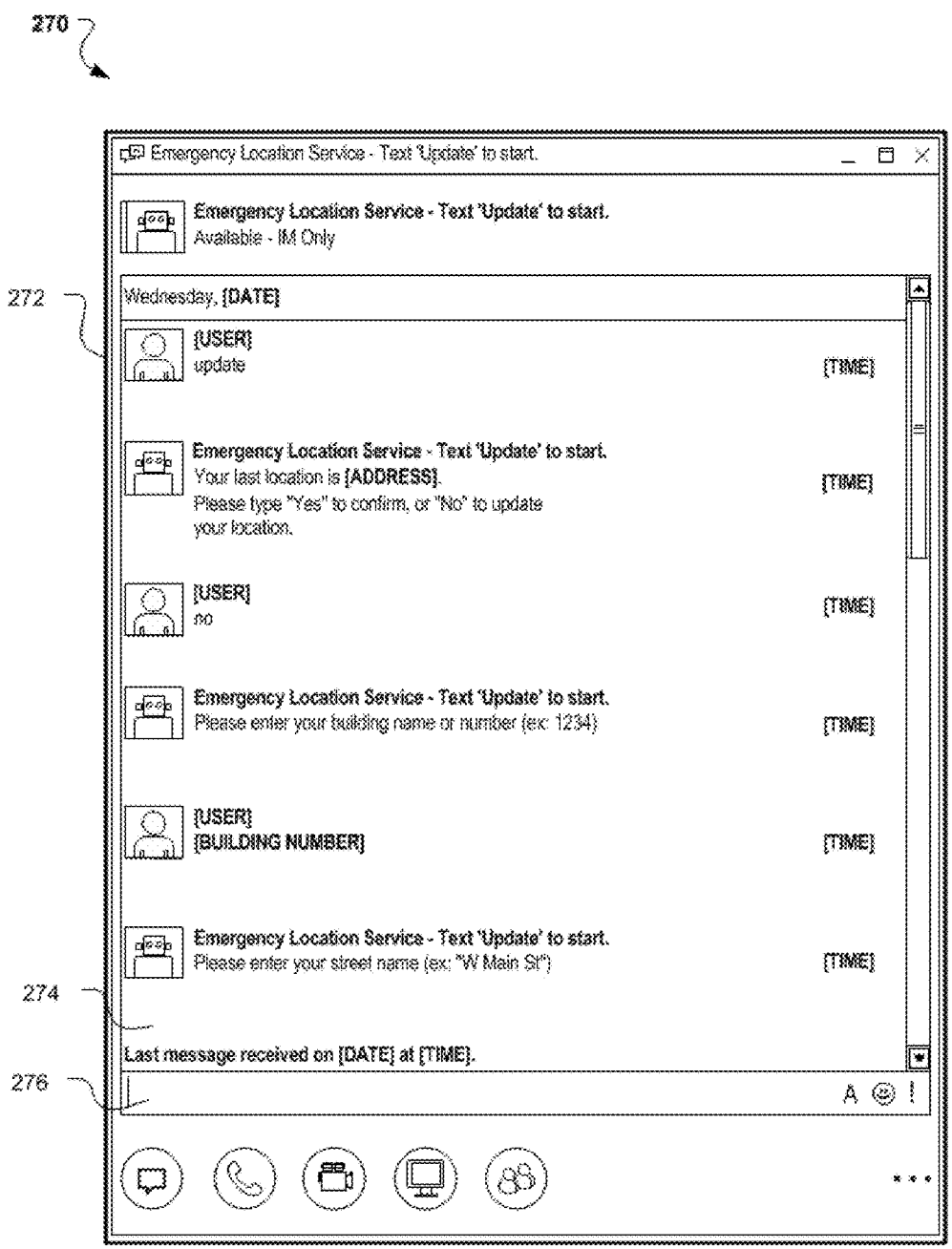

In block 308 of FIG. 4, the VoIP 911 IM application 218 may receive a command from the user where the VoIP user submits the text, "update" via the text input panel 276 of the chat window 270. The VoIP 911 IM application 218 is programmed to recognize such an input as a request/input command from the user to update emergency location information for a VoIP number via the chat window 270. A series of questions may then be transmitted to the user, via the chat window 270, to obtain specific physical location information associated with a VoIP number used by the VoIP user. FIG. 5C illustrates an example of using an "Update" command to update emergency location information for a VoIP user. As shown, the user of FIG. 5C types "update" to prompt the VoIP 911 IM application 218 to initiate a series of questions and retrieve emergency location information from the user. As further shown, the chat window 270 may display a last known location of the VoIP user.

Figure 5D:
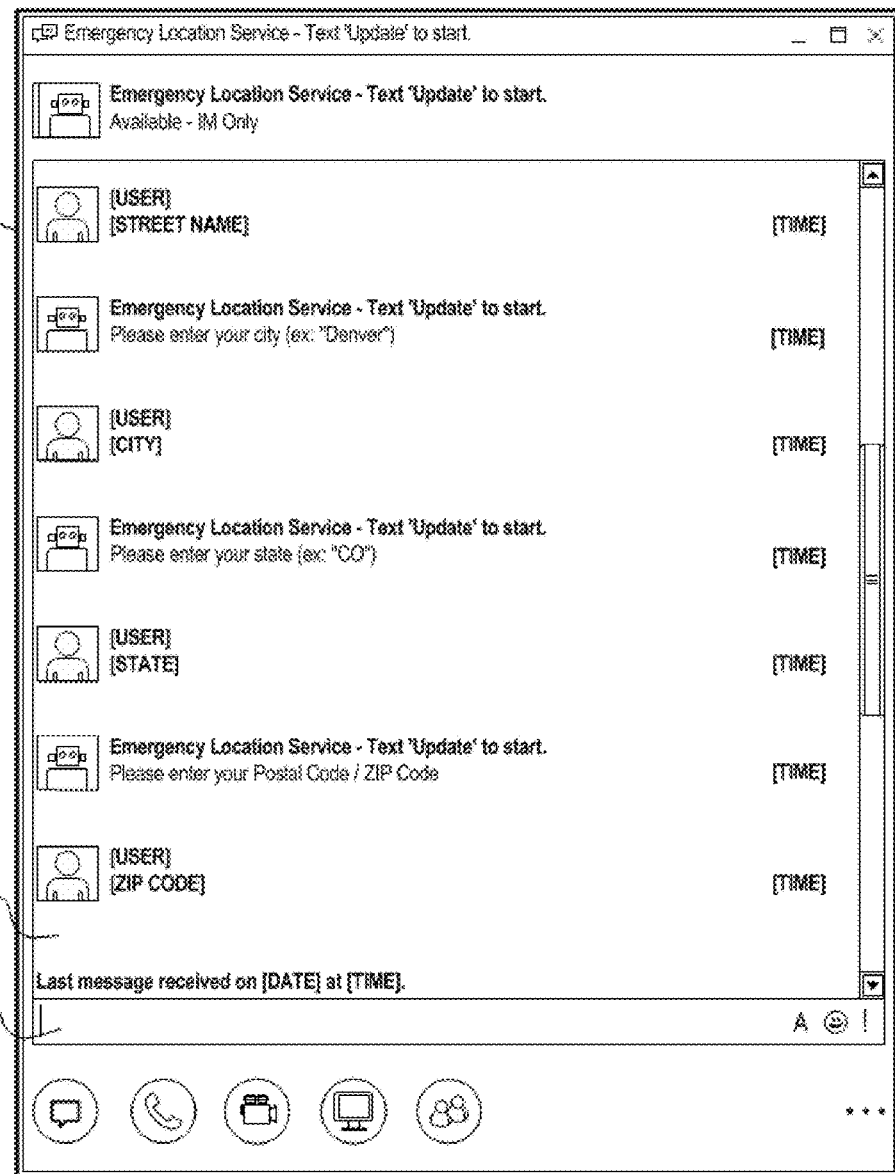
Figure 5E:
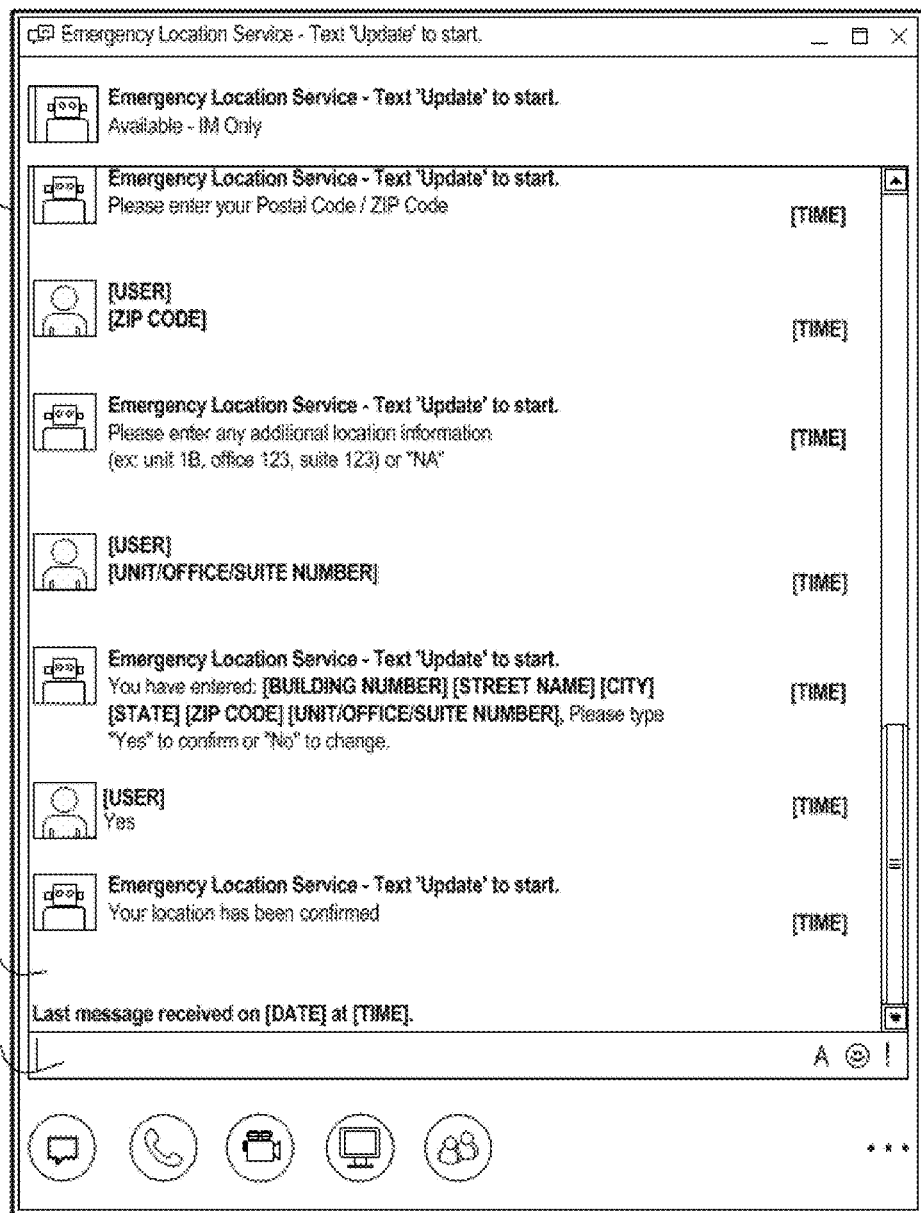
Figure 5F:
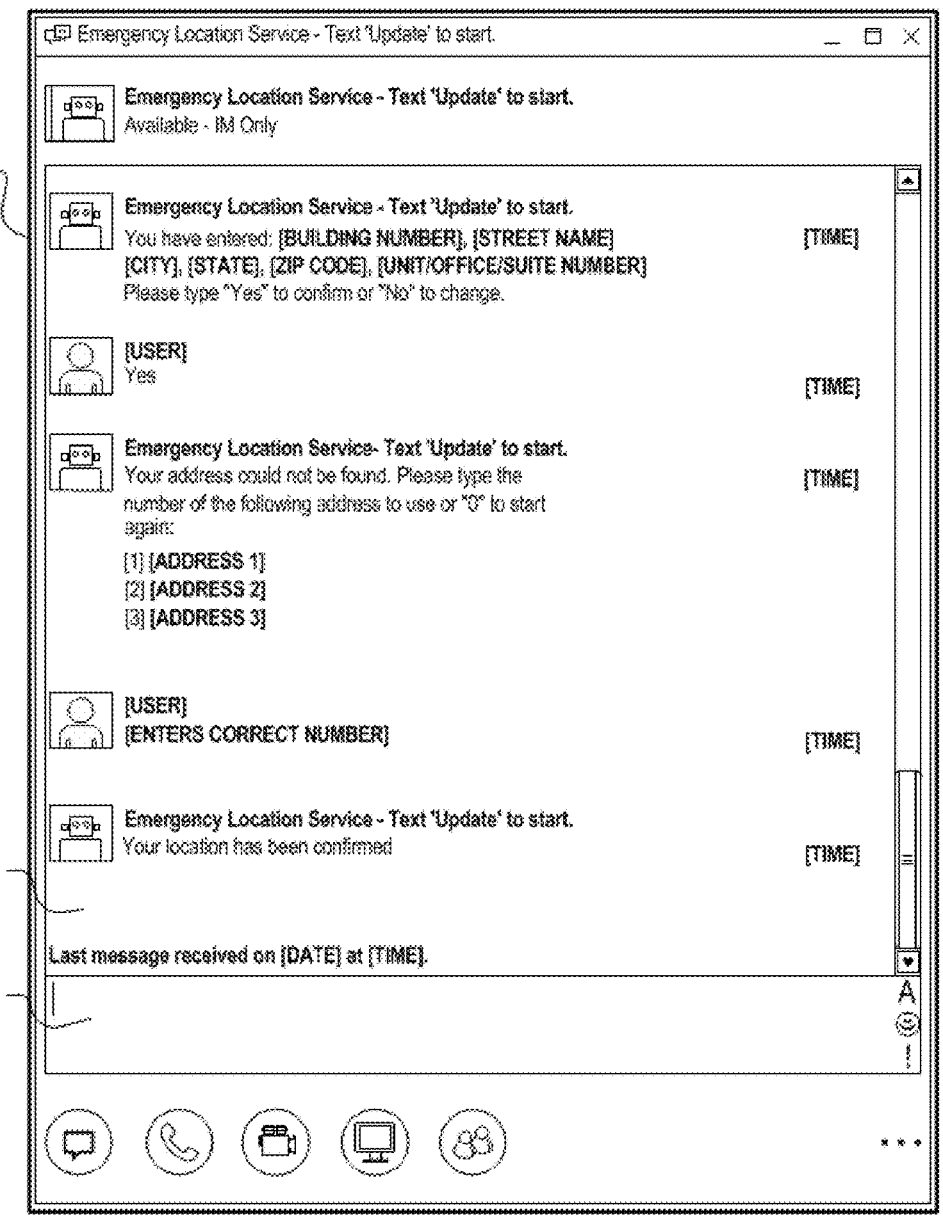

As described in block 310, the VoIP 911 IM application 218 may then collect relevant physical information and address components. The user can be prompted, via the chat window 270, to enter physical location information such as a zip code, postal address, building number, or office number. The VoIP 911 IM application 218 may send the collected information to the network service computing device 222 and the VPC database 250 for MSAG validation and population into the database. As specific examples, the VoIP user may submit a building number, and may interact with the IM application using "No", "yes", and other commands. FIGS. 5C-5E illustrate such interaction between the VoIP user and the VoIP 911 IM application 218. The VoIP 911 IM application 218 can initially display a last known physical address before requesting physical location information from the user. In some embodiments, the chat window 270 can automatically prompt the user to update emergency physical location information when a user is logging into the VoIP 911 IM application 218 from a different or unrecognized IP address.

In block 312, information collected from the VoIP user may be validated by sending the information to the network service computing device 222 and the VPC database 250. The VoIP 911 IM application 218 may maintain an active communication with the VPC database 250 via the network 220 to enable the VoIP 911 IM application 218 to validate addresses in real time and generate valid updated MSAG addresses associated with the address components and physical location information retrieved from the chat window 270. In some embodiments, the VoIP 911 IM application 218 may incorporate aspects of the VoIP 911 validation application 12 of FIGS. 1 and 2. As such, the VoIP 911 IM application 218 may be operable to validate the specific location of a VoIP user submitted to the VoIP 911 IM application 218 via the chat window 270. For example, a VoIP number and an associated physical location of a VoIP user utilizing the VoIP number may be retrieved via the chat window 270. A known postal address may be generated from the physical location information retrieved from the VoIP user and the postal address may be processed using a geographic information system (GIS) system to determine if the postal address is a valid actual address. The postal address may be processed using geocoding to produce a geo-code, the geo-code and the postal address may be applied to a validation process using emergency services open databases, and an updated MSAG address associated with the location of the VoIP user may be generated and displayed to the VoIP user in the chat window 270 for confirmation, as described in block 314.

The VoIP 911 IM application 218 may provide suggestions for the user that attempt to correct or anticipate typographical errors committed by the VoIP user. For example, where the user inputs, "Kansa City, Mo.", the VoIP 911 VoIP 911 IM application 218 can transmit an instant message to the VoIP user that asks, "did you mean Kansas City, Mo.?" In some embodiments, as demonstrated in FIG. 5F, the user can be displayed in the reading pane 274 a list of complete postal addresses or potential MSAG addresses with each potential selection identified by a number. As described in block 316 of FIG. 4, using the chat window 270, the VoIP user can select an address from the list by entering the number in the text input panel 276 corresponding to a specific possible selection displayed in the reading pane 274 of the chat window 270. Thus, the VoIP 911 IM application 218 receives a selected MSAG address from the VoIP user which the user wishes to associate with a given VoIP number.

In block 318 of FIG. 4, upon the VoIP 911 IM application 218 receiving the selected MSAG address from the user via the chat window, emergency information for the VoIP number can be updated and submitted to the VPC database 250 and/or provisioned to the PSAP 252. Thus, when the PSAP 252 receives an emergency call from the VoIP user operating the VoIP number 14, the operator may know the exact, updated address of the VoIP user operating the VoIP number 14 and emergency responders can be dispatched to the correct location despite the virtual network nature of the VoIP number 14. As an example, when a VoIP caller dials 911 using the VoIP number 14, the system 200 identifies the location of the VoIP caller even if the caller has moved his/her location. The updated MSAG address generated by system 200 and the VoIP 911 IM application 218 is a validated updated record that facilitates dispatch of emergency responders. A validated updated record is especially important in the case where the VoIP caller is unable to speak and communicate his/her address during an emergency call.

In some embodiments, the VoIP 911 IM application 218 may display a series of errors or alerts via the chat window 270 to identify failure points when, e.g., a postal address submitted cannot be identified or updated. Where the system 200 is unable to identify a postal address or the VoIP user is faced with one or more errors, the user can optionally contact a phone representative (e.g. a 911 representative team) or initiate a video chat via the chat window 270 and attempt to manually verify a postal address or MSAG address for the VoIP number 14.

In some embodiments, the VoIP 911 IM application 218 may utilize a plurality of API's to communicate with the VPC database 250 (e.g. Intrado) in order to authenticate postal addresses and MSAG addresses for a user operating a given VoIP number 14. In one embodiment, the VoIP 911 IM application 218 functions as an intermediary between the VPC database 250 and the end user. In some embodiments, the VoIP user may communicate with the VoIP 911 IM application 218 using Short Message Service (SMS) text messaging. SMS messages may be sent to the VoIP 911 IM application 218 via a VoIP phone, a smartphone, a tablet, or other such mobile device. In one embodiment, the VoIP 911 IM application 218 is programmed with reporting functionality to track which VoIP users have accepted terms of service and which have not and such information may be stored in a database. Users that fail to accept terms of service or update information can be prompted to review a disclaimer, and submit confirmation as per the above. In another embodiment, the VoIP 911 IM application 218 includes functionality for normalizing or modifying address information to an MSAG address data field, thereby creating a distinct MSAG address prior to submitting the information to VPC database 250 for final validation and/or updating.

In sum, the VoIP 911 IM application 218 enables an end user to update physical location information at any time through the flexibility of a chat window. The VoIP 911 IM application 218 can identify changes in location (change in IP address or change in physical location using GPS) of a VoIP user logged into the application and automatically prompt the user to update an address or other physical location. The VoIP 911 IM application 218 can be integrated within a preexisting IM messaging and communication platform such that access to VoIP 911 IM application 218 can be seamlessly provided to a user via preexisting known systems. As such, the VoIP 911 IM application 218 is convenient to the user because it does not require that the user launch a separate program or tool to update emergency information.

Figure 6:
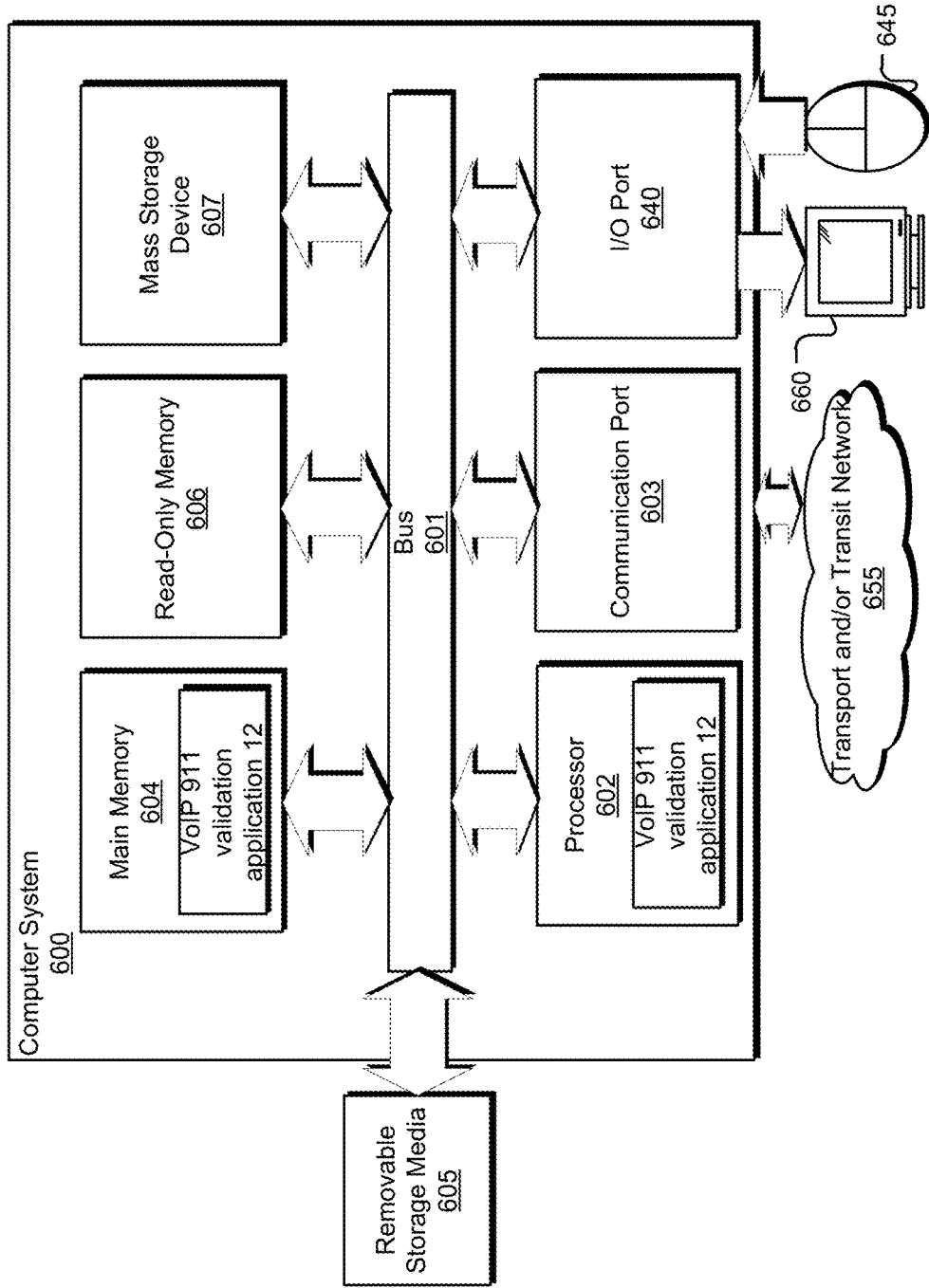
FIG. 6 illustrates an example of a computing system that may implement various systems and methods discussed herein.

FIG. 6 is an example schematic diagram of a computing system 600 that may implement various methodologies discussed herein. For example, the computing system 600 may comprise the network service computing device 22 used to implement the VoIP 911 validation application 12, or it may comprise the computing system 24 used to access the portal 18. The computing system 600 includes a bus 601 (i.e., interconnect), at least one processor 602 or other compute element, at least one communication port 603, a main memory 604, a removable storage media 605, a read-only memory 606, and a mass storage device 607. Processor(s) 602 can be any known processor, such as, but not limited to, an Intel® Itanium® or Itanium 2® processor(s), AMD® Opteron® or Athlon MP® processor(s), or Motorola® lines of processors. Communication port 603 can be any of an RS-232 port for use with a modem based dial-up connection, a 10/100 Ethernet port, a Gigabit port using copper or fiber, or a USB port. Communication port(s) 603 may be chosen depending on a network such as a Local Area Network (LAN), a Wide Area Network (WAN), or any network to which the computer system 600 connects.

Main memory 604 can be Random Access Memory (RAM) or any other dynamic storage device(s) commonly known in the art. Read-only memory 606 can be any static storage device(s) such as Programmable Read-Only Memory (PROM) chips for storing static information such as instructions for processor 602. Mass storage device 607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 601 communicatively couples processor(s) 602 with the other memory, storage, and communications blocks. Bus 601 can be a PCI/PCI-X, SCSI, or Universal Serial Bus (USB) based system bus (or other) depending on the storage devices used. Removable storage media 605 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 604 may be encoded with a VoIP 911 validation application 12 that supports functionality as discussed above. The VoIP 911 validation application 12 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 602 accesses main memory 604 via the use of bus 601 in order to launch, run, execute, interpret, or otherwise perform processes, such as through logic instructions, executing on the processor 602 and based on the VoIP 911 validation application 12 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of validating emergency information for a voice over internet protocol (VoIP) number using an instant messaging (IM) application, comprising:
   utilizing a computing device comprising at least one processing unit in communication with at least one tangible storage media, the tangible storage media further including computer executable instructions for performing operations of:
      displaying a prompt message to a chat window of the IM application to request acknowledgement about predefined terms of service for updating the emergency information associated with the VoIP number;
      receiving a confirmation accepting the predefined terms of service at the chat window;
      receiving a request to update the emergency information at the chat window;
      receiving physical location information in a form of a plurality of text messages inputted through the chat window;
      validating the physical location information;
      displaying at least one address via the chat window based on the physical location information; and
      receiving a selected address by a selection inputted to the chat window.

2. The method of claim 1, further comprising displaying an alternate address.

3. The method of claim 1, further comprising displaying the prompt message upon identifying a change in an IP address associated with the VoIP number.

4. The method of claim 1, further comprising updating the emergency information for the VoIP number using the selected address and transmitting the information to a VoIP positioning center database.

5. The method of claim 1, further comprising receiving the physical location information from a user via a series of predefined text questions and inputs.

6. The method of claim 1, wherein the prompt message includes a hyperlink to a disclaimer.

7. The method of claim 1, further comprising integrating the IM application within an existing unified communications platform.

8. The method of claim 1, further comprising identifying a change in the physical location information of a computing device associated with a user by a global positioning system.

9. The method of claim 1, further comprising validating the physical location information by:
   translating the selecting address to a postal address;
   verifying the postal address is a recognized location using a geographic information system (GIS);
   geocoding the postal address to produce a geocode; and
   generating a master street address guide (MSAG) address using the geocode and the postal address.

10. The method of claim 9, further comprising transmitting the MSAG address to a database of a VoIP positioning center (VPC) so that the MSAG address is available for emergency responders during an emergency call from the VoIP number.

11. The method of claim 1, further comprising:
   retrieving previous entries of emergency information associated with the VoIP number from a database; and
   displaying the previous entries of emergency information via the chat window.

12. An emergency location system for validating emergency information of a voice over internet protocol (VoIP) number using an IM application, comprising:
   a network service computing device comprising at least one memory for storing instructions that are executed by at least one processor to:
      receive a request to update physical location information for the VoIP number via a chat window;
      interpret a plurality of input commands received via the chat window to retrieve the physical location information;
      validate the physical location information;
      receive a selected address based upon the validated physical location information; and
      update the emergency information for the VoIP number using the selected address.

13. The system of claim 12, wherein the IM application is integrated within an existing unified communications platform.

14. The system of claim 12, wherein the request to update the physical location information for the VoIP number is initiated automatically upon a change in an IP address associated with the VoIP number.

15. The system of claim 12, wherein the selected address includes a master street guide address.

16. The system of claim 12, wherein the selected address is provisioned to a database of a VoIP positioning center database such that 911 calls made from the VoIP number are associated with the selected address.

* * * * *